(12) United States Patent
Iezzi

(10) Patent No.: US 8,133,964 B2
(45) Date of Patent: Mar. 13, 2012

(54) SINGLE-COMPONENT COATING HAVING ALKOXYSILANE-TERMINATED N-SUBSTITUTED UREA RESINS

(75) Inventor: Erick B. Iezzi, Arlington, VA (US)

(73) Assignee: Science Applications International Corporation, San Diego, CA (US)

( * ) Notice: Subject to any disclaimer, the term of this patent is extended or adjusted under 35 U.S.C. 154(b) by 65 days.

(21) Appl. No.: 12/825,968

(22) Filed: Jun. 29, 2010

(65) Prior Publication Data

US 2011/0319555 A1 Dec. 29, 2011

(51) Int. Cl.
*C08G 77/26* (2006.01)

(52) U.S. Cl. .............. 528/28; 528/25; 528/38; 528/44

(58) Field of Classification Search .................. None
See application file for complete search history.

(56) References Cited

U.S. PATENT DOCUMENTS

| | | | |
|---|---|---|---|
| 4,625,012 A * | 11/1986 | Rizk et al. ............... | 528/28 |
| 4,640,868 A * | 2/1987 | Penn ....................... | 428/446 |
| 4,923,755 A | 5/1990 | Witucki ................... | 428/447 |
| 5,540,652 A | 7/1996 | Callinan et al. .......... | 602/1 |
| 5,663,215 A * | 9/1997 | Milligan .................. | 523/122 |
| 5,693,703 A * | 12/1997 | Hart ....................... | 524/502 |
| 5,744,528 A | 4/1998 | Callinan et al. .......... | 524/265 |
| 5,919,860 A | 7/1999 | Roesler et al. .......... | 524/838 |
| 6,001,214 A * | 12/1999 | Hsieh et al. ............. | 156/329 |
| 6,077,902 A | 6/2000 | Roesler et al. .......... | 524/589 |
| 6,197,912 B1 * | 3/2001 | Huang et al. ........... | 528/28 |
| 6,281,322 B1 * | 8/2001 | Groth et al. ............. | 528/28 |
| 6,288,198 B1 * | 9/2001 | Mechtel et al. .......... | 528/28 |
| 6,492,482 B2 * | 12/2002 | Lomoelder et al. ..... | 528/38 |
| 6,498,210 B1 * | 12/2002 | Wang et al. ............. | 524/588 |
| 6,749,943 B1 * | 6/2004 | Tangen et al. ........... | 428/447 |
| 2003/0111553 A1 | 6/2003 | Hunter et al. ........... | 239/398 |
| 2007/0129527 A1 | 6/2007 | Griswold ................. | 528/64 |
| 2007/0129528 A1 * | 6/2007 | Huang et al. ........... | 528/78 |
| 2009/0227792 A1 | 9/2009 | Briehn et al. ........... | 544/229 |
| 2009/0264612 A1 | 10/2009 | Stanjek et al. .......... | 528/38 |
| 2010/0063238 A1 * | 3/2010 | Zhang et al. ............ | 528/58 |
| 2011/0027489 A1 * | 2/2011 | Groenewolt et al. .... | 427/387 |

FOREIGN PATENT DOCUMENTS

WO WO-2009077181 A1 * 6/2009

OTHER PUBLICATIONS

International Search Report and Written Opinion for Application Serial No. PCT/US2010/40332, dated Aug. 30, 2010, 10 pp.

* cited by examiner

*Primary Examiner* — Robert S Loewe
(74) *Attorney, Agent, or Firm* — King & Spalding LLP

(57) ABSTRACT

The coating described herein attempts to provide this solution by synthesizing alkoxysilane-terminated N-substituted urea resins, then formulating them into moisture-curable single-component (1K) topside coatings. These coatings will provide greater external stability (to UV and visible radiation), cleanability, flexibility, cure times and lower VOC content than the currently qualified silicone alkyd topside coatings that are found on Navy ships. The single-component coating can include at least an alkoxysilane-terminated N-substituted urea resin, a reactive diluent, a pigment, a filler, and a catalyst. The resin can include an amino-functional silane substituted at the N-position and a non-aromatic isocyanate.

16 Claims, No Drawings

SINGLE-COMPONENT COATING HAVING ALKOXYSILANE-TERMINATED N-SUBSTITUTED UREA RESINS

TECHNICAL FIELD

The present application relates generally to the synthesis of alkoxysilane-terminated N-substituted urea resins and their application in single-component coatings.

BACKGROUND

The Navy currently has only one topside coating that is qualified for use under MIL-PRF-24635. This coating, which is a silicone alkyd, has been used by the Navy for over 50 years, even though the technology continues to provide poor exterior durability (color and gloss retention upon exposure to an oxidative environment with UV and visible light), poor chemical resistance, low hardness, slow cure times and limited cleanability. The formulation of low volatile organic component ("VOC") versions has also recently become difficult, as the utilization of lower viscosity raw materials are increased in effort to maintain sprayable and/or rollable formulations. Unfortunately, this continued decrease in viscosity is typically accompanied by a reduction in resin molecular weight and cross-linkable functionality, thereby reducing the cross-link density and hardness of the resulting cured coating. A reduction in the molecular weight of resin components can also lead to sagging of the coating when applied. The VOC of silicone alkyd formulations has also been lowered by using exempt solvents, such as Oxsol 100, which do not count against the VOC rule. Although these solvents do not contribute to ozone depletion, it remains beneficial for paint applicators to use coatings with the lowest solvent content possible.

Silicone alkyd coatings can be formulated as single-component (also known as "1K") systems because their cross-linking mechanism occurs as a result of atmospheric oxygen reacting with residual alkenes contained within the resins of the coating. The coating does not begin to cure until it is applied on a surface and the solvent evaporates, thereby giving it essentially a limitless pot-life, unlike two-component (2K) systems that begin to react once the components are mixed. Because it is a single-component system, no specialty mixing, equipment, or training is needed to apply the coating, as it can be easily spray-applied by individuals during depot level painting. Navy sailors are routinely found applying (via roller or brush) silicone alkyd coatings to a ship for the sake of touch-up and/or beauty coating, yet this mundane and non war-related task would not be required if the silicone alkyd coatings already on the ship did not fade, chalk, discolor or stain within only a few months after application.

Acrylic siloxanes are conventionally used as both additives and base resins in commercial coatings. These resins are easily manufactured via polymerization of alkoxysilane-functional acrylate monomers with ethyl, butyl, or hexyl acrylate and/or meth(acrylate) monomers. Depending on the molecular weight, acrylic siloxane resins may contain moderate-to-high VOC levels, yet because the alkoxysilane groups are the only reactive functionality, these resins can be used to generate single-component (1K) coatings. Nevertheless, while these moisture curable resins are found in commercial 1K coatings, they are not without their drawbacks. The biggest problem with acrylic siloxanes is that they are slow to cure when not exposed to high humidity environments.

SUMMARY OF THE INVENTION

It is desirable have a single component topside coating. The coating described herein attempts to provide this solution by synthesizing alkoxysilane-terminated N-substituted urea resins, then formulating them into moisture-curable single-component (1K) topside coatings. These coatings will provide greater external stability (color and gloss retention upon exposure to UV and visible light), cleanability, flexibility, cure times and lower VOC content than the currently qualified silicone alkyd topside coatings that are found on Navy ships.

In one embodiment, a single-component coating comprises an alkoxysilane-terminated N-substituted urea resin, a reactive diluent, a pigment, a filler, and a catalyst.

In another embodiment, a resin comprises an amino-functional silane substituted at the N-position and a non-aromatic isocyanate.

In yet another embodiment, a method for producing a single component coating, the method comprises synthesizing a resin from an amino-functional silane substituted at the N-position and a non-aromatic isocyanate; and mixing the synthesized resin with a catalyst, a pigment, a filler, and a reactive diluent.

Additional features and advantages of an embodiment will be set forth in the description which follows, and in part will be apparent from the description, or may be learned by practice of the invention. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

DETAILED DESCRIPTION

Reference will now be made in detail to the preferred embodiments of the present invention, examples of which are illustrated in the accompanying drawings.

A single-component coating is one that is pre-mixed and does not require any additional additives before being applied to a surface. The coating may need to be shaken before use, but the entire product is contained within a single can. By using a single-component coating, less material is wasted and the product is easier to use. The term "single-component" or "1K" is not intended to mean that the coating is made from a single chemical or substance, but rather that the end product does not need to be mixed with another component before application as a coating. The single-component coating described herein can be applied to a primer or directly to a metal substrate.

An exemplary single-component coating has various components, including, but not limited to, a resin formed from an amino-functional silane substituted at the N-position and a non-aromatic isocyanate. The resin should be alkoxysilane-terminated and be a urea resin. In an exemplary embodiment, the resin is formed of a combination of an isocyanate and a N-substituted amino-functional alkoxysilane in a ratio of about 1:1. In other examples, the ratio can range from about 1.05:1 to about 1:1.05.

The amino-functional silane substituted at the N-position can be an alkoxysilane. Examples include N-butyl-3-aminopropyltrimethoxysilane, commercially available as SIB1932.2 from Gelest or Dynasylan 1189 from Evonik; N-butyl-3-aminopropylmethyldimethoxysilane, commercially available as 3B3-073658 from 3B Scientific Corp.; N-butyl-3-aminopropyltriethoxysilane; N-ethyl-3-aminopropyltriethoxysilane; N-phenyl-3-aminopropyltrimethoxysilane, commercially available as SIP6724.0 from Gelest; N-cyclohexyl-3-aminopropyltrimethoxysilane, commercially available as 3B3-072498 from 3B Scientific Corp.; N-hexyl-3-aminopropyltrimethoxysilane; N-pentyl-3-aminopropyltrimethoxysilane; N-isopropyl-3-aminopropyltrimethoxysilane; or N-isobutyl-3-aminopropyltrimethoxysilane.

The non-aromatic isocyanate can be an aliphatic or cycloaliphatic polyisocyanate, which is more durable to exterior elements than an aromatic isocyanate. Examples include aliphatic polyisocyanate based on HDI trimer, commercially available as Desmodur N 3600 from Bayer; aliphatic polyisocyanate based on HDI uretdione, commercially available as Desmodur XP 2730 from Bayer; aliphatic polyisocyanate based on HDI biuret, commercially available as Desmodur N 3200 from Bayer; aliphatic polyisocyanate based on HDI allophanate trimer, commercially available as Desmodur XP 2731 from Bayer; aliphatic polyisocyanate based on asymmetric HDI trimer, commercially available as Desmodur XP 2410 from Bayer; cycloaliphatic polyisocyanate based on IPDI trimer, commercially available as Desmodur Z 4700 from Bayer; cycloaliphatic polyisocyanate based on IPDI allophanate, commercially available as Desmodur XP 2565 from Bayer; aliphatic polyisocyanate based on HMDI biuret, commercially available as Basonat HB 100 from BASF; and aliphatic polyisocyanate based on HDI trimer, commercially available as Basonat HI 100 from BASF.

An exemplary process for producing the single-component coating follows. To synthesize the resin depicted below, 81.6 g (0.446 mol) of Desmodur N 3600 (an aliphatic polyisocyanate resin from Bayer Material Science) was dissolved in 60 g butyl propionate (commercially available from Aldrich) in a 500 ml 3-neck round bottom flask equipped with an Argon inlet and thermometer. The temperature of the solution was heated to 50° C., then 104.9 g (0.446 mol) of N-butyl-3-aminopropyltrimethoxysilane (commercially available as Dynasylan 1189 from Evonik Corporation) was added dropwise to the solution while keeping the temperature between 50-60° C. After the addition was complete, the reaction was heated at 50° C. for 30 minutes. Drying agents, such as vinyltrimethoxysilane, can also be added to the reaction in amounts of about 1.5% by weight. The resin was 76 wt. % solids (as determined by 110° C. for 1 hour). The resin can be synthesized using aromatic solvents, ester-based solvents, or others known to one of ordinary skill in the art.

Referring to the FIGURE below, in a first example, the synthesis of trimethoxysilane-terminated N-butyl urea resin is shown. Infrared (IR) spectroscopy showed that no more free or reactive isocyanate (NCO) (2260 cm$^{-1}$) remained in solution.

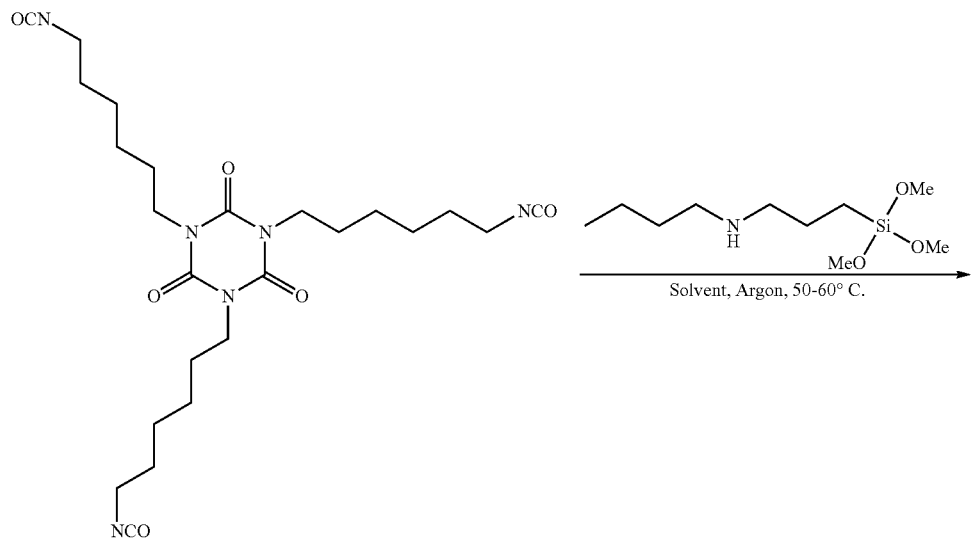

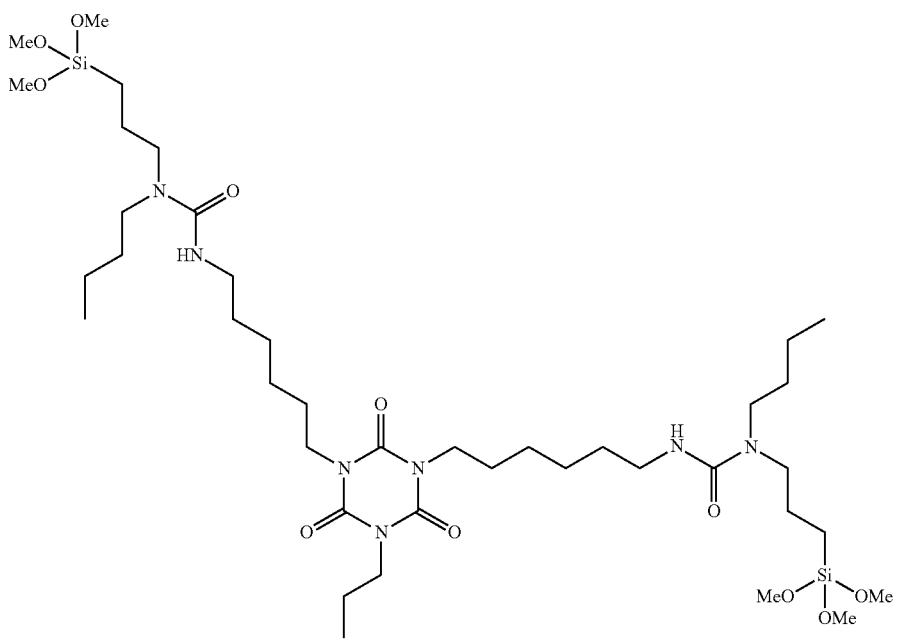

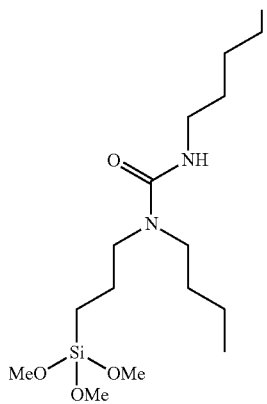

The resin is a trimethoxysilane-terminated N-butyl urea resin, which has the chemical name urea, N,N'',N''''-[(5-trioxo-1,5-triazine-1,3,(2H,4H,6H)-triyl)tri-6,1-hexanediyl]tris[N-butyl-N'-[3-(trimethoxysilyl)propyl]- or 1,1',1''-(6,6',6''-(2,4,6-trioxo-1,3,5-triazinane-1,3,5-triyl)tris(hexane-6,1-diyl))tris(3-butyl-3-(trimethoxysilyl)propyl)urea).

The resin described herein allows terminal alkoxysilane groups to be moderate-to-fast reacting due to inclusion of a substituent on a nitrogen atom of the urea linkage. Commercial acrylic siloxane resins are slow to react because they do not have nitrogen's electron density to aid with moisture hydrolysis. However, if a urea linkage has a substituent on a nitrogen atom, as is the case with the herein described resins, then the urea linkage would no longer remain planar as the substituted nitrogen fragment rotates to alleviate sterric interactions, and nitrogen's lone pair would now become available to aid with hydrolysis of the tethered alkoxysilane group. Greater rotation within the urea linkages will also lead to less intermolecular hydrogen bonding, thereby yielding coatings with greater flexibility and lower viscosity.

Alternative versions of the resin can be synthesized using mixtures of N-substituted aminoalkoxysilanes and di-substituted amines, so that all portions of the resulting resin do not contain terminal alkoxysilane groups, yet the resin still remains an N-substituted urea.

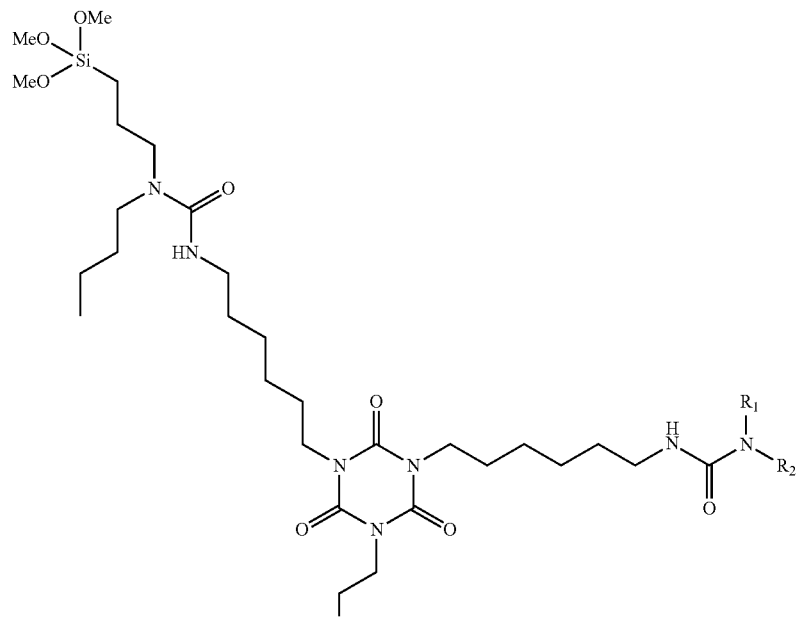

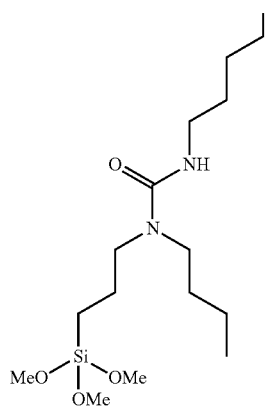

As shown in the FIGURE directly above, in a second example, two-thirds of the isocyanate groups were reacted with N-butyl-3-aminopropyltrimethoxysilane, whereas one-third of the isocyanate groups were reacted with a di-substituted amine. This di-substituted amine can contain aliphatic, cycloaliphatic, or aromatic groups, and $R_1$ and $R_2$ can be the same group or different.

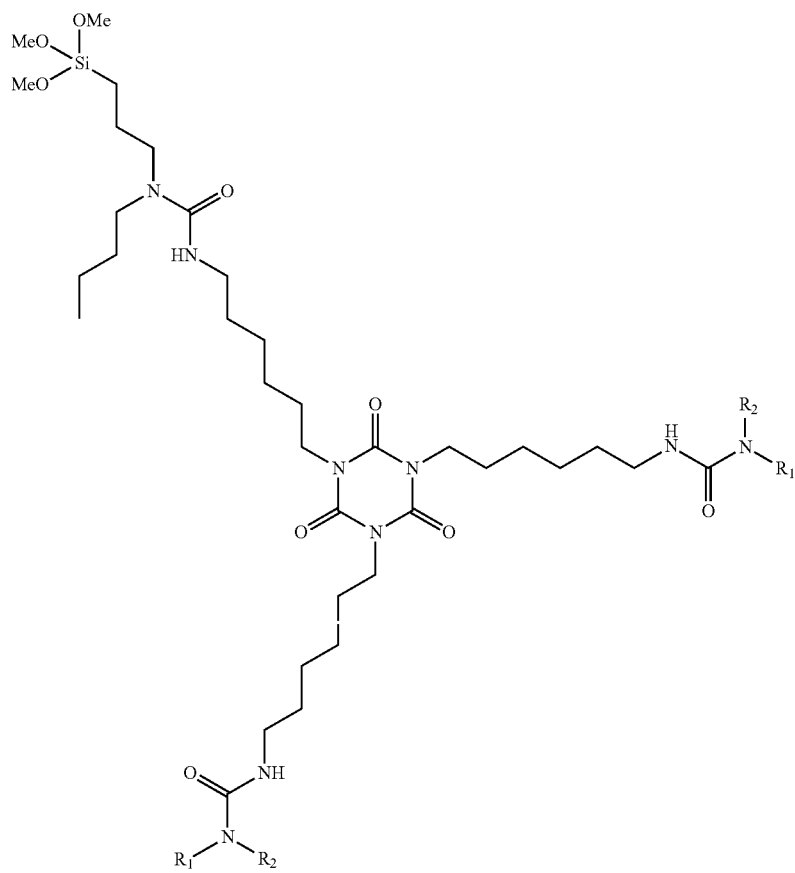

As shown directly above, in a third example, one-third of the isocyanate groups were reacted with N-butyl-3-aminopropyltrimethoxysilane, whereas two-thirds of the isocyanate groups were reacted with a di-substituted amine. This di-substituted amine can contain aliphatic, cycloaliphatic, or aromatic groups, and $R_1$ and $R_2$ can be the same group or different.

Examples of commercially available di-substituted amines include, but are not limited to, N,N-dibutylamine, N,N-diethylamine, N,N-dimethylamine, N,N-diisopropylamine, N,N-dicyclohexylamine, N,N-diphenylamine, N-methylcyclohexylamine, N-tert-butylcyclohexylamine, N-ethylcyclohexylamine, N-butylcyclohexylamine, N-ethylaniline, N-butylaniline.

The resin can be used to form a single component coating. About 105.26 g of the resin from the FIGURE of the first example above is mixed with 35 g of various pigments (e.g., titanium dioxide or colorants), 5 g of a matting agent (e.g., amorphous silica or micronized urea), 20 g of an alkoxysilane-functional diluent (e.g., hexyltrimethoxysilane, oligomeric methyl silicates), and 0.5 g of a catalyst (e.g., dibutyltin dilaurate). In testing, the formulas were coated on tinplate test panels and allowed to cure for 7 days at ambient conditions (75° F., 50% R.H.) before being tested. The coatings were tack-free after several hours. Once cured, the coatings demonstrated good hardness, flexibility, and solvent resistance. The cured coatings also showed good color and gloss retention upon exposure to ultraviolet and visible radiation from QUV-B and weatherometer (WOM) instruments. For instance, the color change (delta E) of the coatings was <0.4 after 1000 hours WOM exposure.

In other embodiments, coatings of various gloss levels and colors have been made using a variety of pigments, reactive diluents, fillers, and other additives. For example, the coating can also include a silicone-based diluent, such as methoxy-functional silicone resin, commercially available as Silres SY 231 from Wacker; oligomeric methyl silicates, commercially available as Silres MSE 100 from Wacker; hexyltrimethoxysilane, commercially available as SIH6168.5 from Gelest; octylmethyldiethoxysilane, commercially available as SIO6712.4 from Gelest; n-octyltrimethoxysilane, commercially available as SIO6715.5 from Gelest; and methoxy functional silicone, commercially available as DC-3074 Intermediate from Dow Corning.

The single-component coating can also include a catalyst, which can be used to accelerate the rate of cure. In one example, the catalyst can include dibutyltin dilaurate ("DBTDL"). The single-component coating can also include one or more of various pigments, fillers, additives (e.g., adhesion promoters, wetting and dispersing agents, thickening agents), and solvents known to a person having ordinary skill in the art.

Silicone-containing coatings are becoming increasing popular within the global coatings market due to their outstanding external durability, chemical resistance, ability to cure with atmospheric moisture, and reduced VOC requirements. Siloxane coatings have an inherent advantage over conventional organic coatings due to the presence of silicone-oxygen bonds. For instance, the Si—O bond, which has an enthalpy of 110 kcal/mol, is much stronger than a carbon-hydrogen (99 kcal/mol) or carbon-carbon bond (83 kcal/mol), thereby leading to an increased ultraviolet (UV), oxidative and thermal stability.

A large majority of commercially available siloxane-based materials are designed to react in the presence of moisture. Typically, these siloxane materials contain hydrolyzable alcohol groups, such as methanol or ethanol, which are bound to the silicone atom. When moisture is present, the alcohol groups are released and silanol (Si—OH) groups are formed. The silanols then condense with one another, both intra- and intermolecularly, to yield a cured siloxane network. The number of alcohol groups on a silicone atom will determine the potential points of hydrolysis, and a greater number of condensed silanol groups will result in a higher cross-link density within the coating.

Examples of the single component coating are provided below. The percentages of each material in the single-component coatings are merely exemplary and are not intended to be limited to those particular percentages or ratios.

Example 1

Semi-Gloss, Light Gray

| Trade/Chemical Name | Wt. % of Formula |
|---|---|
| DBTDL | 0.30% |
| N-substituted urea resin (as shown in the figure in the first example) | 63.50% |
| Titanium dioxide | 18.20% |
| Shepherd black 10C909A | 3.00% |
| Amorphous silica | 3.00% |
| Silres MSE 100 | 12.00% |

Example 2

Semi-Gloss, Light Gray

| Trade/Chemical Name | Wt. % of Formula |
|---|---|
| DBTDL | 0.30% |
| N-substituted urea resin (as shown in the figure in the first example) | 61.64% |
| Titanium dioxide | 16.40% |
| Shepherd black 10C909A | 7.03% |
| Amorphous silica | 2.93% |
| Hexyltrimethoxysilane | 11.70% |

Example 3

Flat, Haze Gray

| Trade/Chemical Name | Wt. % of Formula |
|---|---|
| DBTDL | 0.48% |
| N-substituted urea resin (as shown in the figure in the first example) | 71.00% |
| Titanium dioxide | 7.00% |
| Shepherd Black 30C940 | 1.74% |
| Shepherd Green 410 | 1.17% |
| Shepherd Yellow 30C119 | 0.60% |
| Amorphous silica | 12.00% |
| Hexyltrimethoxysilane | 6.00% |

Example 4

Flat, Haze Gray

| Trade/Chemical Name | Wt. % of Formula |
|---|---|
| DBTDL | 0.49% |
| N-substituted urea resin (as shown in the figure in the first example) | 64.35% |
| Titanium dioxide | 7.12% |
| Shephard Black 30C940 | 1.77% |
| Shephard Green 410 | 1.19% |
| Shephard Yellow 30C119 | 0.61% |
| Amorphous silica | 12.22% |
| Silres SY 231 | 12.22% |

Example 5

High Gloss, White

| Trade/Chemical Name | Wt. % of Formula |
|---|---|
| DBTDL | 0.30% |
| N-substituted urea resin (as shown in the figure in the first example) | 65.47% |
| Titanium dioxide | 21.77% |
| Silres SY 231 | 12.44% |

Example 6

High Gloss, White

| Trade/Chemical Name | Wt. % of Formula |
|---|---|
| DBTDL | 0.30% |
| N-substituted urea resin (as shown in the figure in the first example) | 65.47% |
| Titanium dioxide | 21.77% |
| Hexyltrimethoxysilane | 12.44% |

The single-component, low VOC, moisture-curable silicone-containing coating described herein can solve many of the problems that are inherent with many commercial single component coatings, while also remaining applicable to both depot level and ship's force painters. The developed coating should greatly outperform the Navy's qualified silicone alkyd coatings in terms of exterior durability (color stability and gloss retention), cleanability, flexibility and cure times, while also overcoming a limit of acrylic siloxane coatings, which is the inability to properly cure when not exposed to a high humidity environment.

The embodiments described above are intended to be exemplary. One skilled in the art recognizes that numerous alternative components and embodiments that may be substituted for the particular examples described herein and still fall within the scope of the invention.

What is claimed is:

1. A single-component coating comprising:
   an alkoxysilane-terminated N-substituted urea resin, formed by reacting (i) an aliphatic polyisocyanate and a mixture of (ii) an amino-functional siloxane which is substituted at the N-position with a group selected from C3-C6 alkyl, cyclohexyl, and phenyl and (iii) a disubstituted amine $NR^1R^2$, where each of $R^1$ and $R^2$ is independently an aliphatic, cycloaliphatic, or aromatic group;

such that said resin has no free isocyanate groups;

and further comprising a reactive diluent; a pigment; a filler; and a catalyst.

2. The single-component coating according to claim 1, wherein the alkoxysilane-terminated N-substituted urea resin is formed from said mixture of amino-functional siloxane (ii) and disubstituted amine (iii), in a 1:2 ratio, and said aliphatic polyisocyanate.

3. The single-component coating according to claim 1, wherein the alkoxysilane-terminated N-substituted urea resin is formed from said mixture of amino-functional siloxane (ii) and disubstituted amine (iii), in a 2:1 ratio, and said aliphatic polyisocyanate.

4. The single-component coating according to claim 1, wherein the amino-functional siloxane is selected from the group consisting of:
N-butyl-3-aminopropyltrimethoxysilane,
N-butyl-3-aminopropylmethyldimethoxysilane,
N-butyl-3-aminopropyltriethoxysilane,
N-ethyl-3-aminopropyltriethoxysilane,
N-cyclohexyl-3-aminopropyltrimethoxysilane,
N-phenyl-3-aminopropyltrimethoxysilane,
N-hexyl-3-aminopropyltrimethoxysilane,
N-pentyl-3-aminopropyltrimethoxysilane,
N-isopropyl-3-aminopropyltrimethoxysilane, and
N-isobutyl-3-aminopropyltrimethoxysilane.

5. The single-component coating according to claim 1, wherein the aliphatic polyisocyanate is selected from the group consisting of:
aliphatic polyisocyanate based on HDI trimer,
aliphatic polyisocyanate based on HDI uretdione,
aliphatic polyisocyanate based on HDI biuret,
aliphatic polyisocyanate based on HDI allophanate trimer, and
aliphatic polyisocyanate based on asymmetric HDI trimer.

6. The single-component coating according to claim 1, wherein the reactive diluent is a silicone-based diluent.

7. The single-component coating according to claim 6, wherein the reactive diluent is selected from the group consisting of:
oligomeric methyl silicates,
hexyltrimethoxysilane,
octylmethyldiethoxysilane,
n-octyltrimethoxysilane, and
methoxy functional silicone.

8. The single-component coating according to claim 1, wherein the alkoxysilane-terminated N-substituted urea resin comprises about 61 to 71 percent of the coating by weight.

9. A resin formed by reacting
(i) an aliphatic polyisocyanate and a mixture of (ii) an amino-functional siloxane which is substituted at the N-position with a group selected from C3-C6 alkyl, cyclohexyl, and phenyl and (iii) a disubstituted amine $NR^1R^2$, where each of $R^1$ and $R^2$ is independently an aliphatic, cycloaliphatic, or aromatic group; such that said resin has no free isocyanate groups.

10. The resin according to claim 9, wherein the amino-functional siloxane is selected from the group consisting of:
N-butyl-3-aminopropyltrimethoxysilane,
N-butyl-3-aminopropylmethyldimethoxysilane,
N-butyl-3-aminopropyltriethoxysilane,
N-ethyl-3-aminopropyltriethoxysilane,
N-cyclohexyl-3-aminopropyltrimethoxysilane,
N-phenyl-3-aminopropyltrimethoxysilane,
N-hexyl-3-aminopropyltrimethoxysilane,
N-pentyl-3-aminopropyltrimethoxysilane,
N-isopropyl-3-aminopropyltrimethoxysilane, and
N-isobutyl-3-aminopropyltrimethoxysilane.

11. The resin according to claim 9, wherein the aliphatic polyisocyanate is selected from the group consisting of:
aliphatic polyisocyanate based on HDI trimer,
aliphatic polyisocyanate based on HDI uretdione,
aliphatic polyisocyanate based on HDI biuret,
aliphatic polyisocyanate based on HDI allophanate trimer,
aliphatic polyisocyanate based on asymmetric HDI trimer.

12. A method for producing a single-component coating, the method comprising:
synthesizing a resin from
an aliphatic polyisocyanate and a mixture of (ii) an amino-functional siloxane which is substituted at the N-position with a group selected from C3-C6 alkyl, cyclohexyl, and phenyl and (iii) a disubstituted amine $NR^1R^2$, where each of $R^1$ and $R^2$ is independently an aliphatic, cycloaliphatic, or aromatic group; such that said resin has no free isocyanate groups; and
mixing the synthesized resin with a reactive diluent, a pigment, a filler, and a catalyst.

13. The method according to claim 12, wherein the amino-functional siloxane is selected from the group consisting of:
N-butyl-3-aminopropyltrimethoxysilane,
N-butyl-3-aminopropylmethyldimethoxysilane,
N-butyl-3-aminopropyltriethoxysilane,
N-ethyl-3-aminopropyltriethoxysilane,
N-cyclohexyl-3-aminopropyltrimethoxysilane,
N-phenyl-3-aminopropyltrimethoxysilane,
N-hexyl-3-aminopropyltrimethoxysilane,
N-pentyl-3-aminopropyltrimethoxysilane,
N-isopropyl-3-aminopropyltrimethoxysilane, and
N-isobutyl-3-aminopropyltrimethoxysilane.

14. The method according to claim 12, wherein the aliphatic polyisocyanate is selected from the group consisting of:
aliphatic polyisocyanate based on HDI trimer,
aliphatic polyisocyanate based on HDI uretdione,
aliphatic polyisocyanate based on HDI biuret,
aliphatic polyisocyanate based on HDI allophanate trimer,
aliphatic polyisocyanate based on asymmetric HDI trimer.

15. The method according to claim 12, wherein the reactive diluent is a silicone-based reactive diluent.

16. The method according to claim 12, wherein the reactive diluent is selected from the group consisting of:
oligomeric methyl silicates,
hexyltrimethoxysilane,
octylmethyldiethoxysilane,
n-octyltrimethoxysilane, and
methoxy functional silicone.

* * * * *